(12) United States Patent
Dannebey

(10) Patent No.: US 7,648,355 B2
(45) Date of Patent: Jan. 19, 2010

(54) BELL-NOZZLE BLOW-MOLDING OR STRETCH-BLOW-MOLDING PLANT FOR MAKING THERMOPLASTIC CONTAINERS AND MOLD THEREFOR

(75) Inventor: Laurent Dannebey, Octeville sur Mer (FR)

(73) Assignee: Sidel Participations, Octeville Sur Mer (FR)

( * ) Notice: Subject to any disclaimer, the term of this patent is extended or adjusted under 35 U.S.C. 154(b) by 412 days.

(21) Appl. No.: 11/629,664

(22) PCT Filed: Jun. 9, 2005

(86) PCT No.: PCT/FR2005/001433

§ 371 (c)(1),
(2), (4) Date: Dec. 15, 2006

(87) PCT Pub. No.: WO2006/003310

PCT Pub. Date: Jan. 12, 2006

(65) Prior Publication Data

US 2007/0254061 A1    Nov. 1, 2007

(30) Foreign Application Priority Data

Jun. 16, 2004    (FR)    ................ 04 06531

(51) Int. Cl.
*B29C 49/58* (2006.01)

(52) U.S. Cl. .......... 425/182; 425/529; 425/535

(58) Field of Classification Search ............ 425/182, 425/529, 535
See application file for complete search history.

(56) References Cited

U.S. PATENT DOCUMENTS

| 3,211,543 | A * | 10/1965 | Koop ............ 249/141 |
| 6,279,916 | B1 * | 8/2001 | Stecher ............ 277/592 |
| 6,464,486 | B1 | 10/2002 | Barray et al. |
| 2005/0238753 | A1 | 10/2005 | Arakelyan et al. |
| 2006/0093699 | A1 | 5/2006 | Arakelyan |

FOREIGN PATENT DOCUMENTS

| FR | 2764544 A1 | 12/1998 |
| FR | 2 790 704 A | 9/2000 |
| FR | 2828829 A1 | 2/2003 |
| FR | 2 833 512 A | 6/2003 |
| FR | 2841495 A1 | 1/2004 |
| FR | 2843714 A1 | 2/2004 |

* cited by examiner

*Primary Examiner*—Robert B Davis
(74) *Attorney, Agent, or Firm*—Sughrue Mion, PLLC

(57) ABSTRACT

A blow-molding or stretch-blow molding plant for making containers from thermoplastic polymer blanks, in particular PET, including a blowing bell-nozzle for blowing a pressurized fluid into a blank arranged in a cavity of a mold, the nozzle having one end adapted to be sealingly supported in front against a support plate provided in one surface of the mold capping the neck of the blank; the support plate is ring-shaped having an outline of similar shape as that of the outline of the end of the nozzle, the ring being engaged in a gutter which is hollowed out in the surface of the mold and which surrounds spaced apart the opening through which the neck of the blank passes.

9 Claims, 2 Drawing Sheets

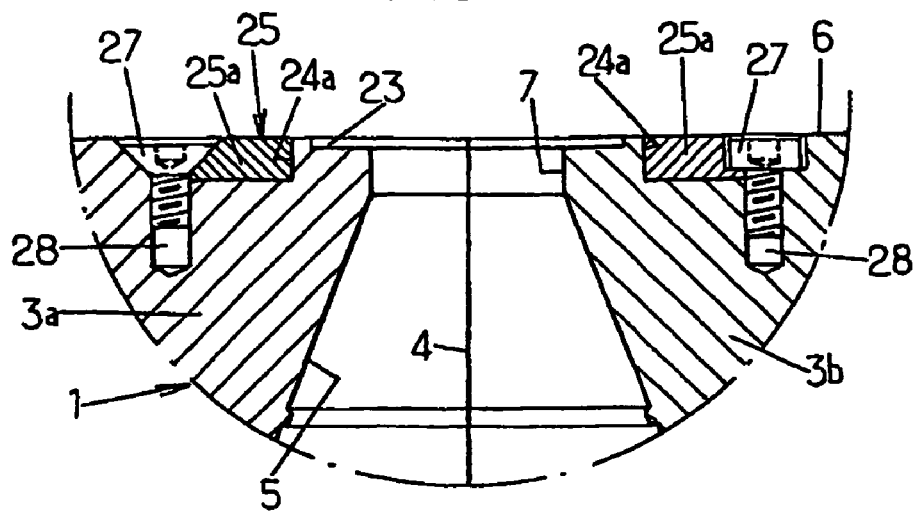
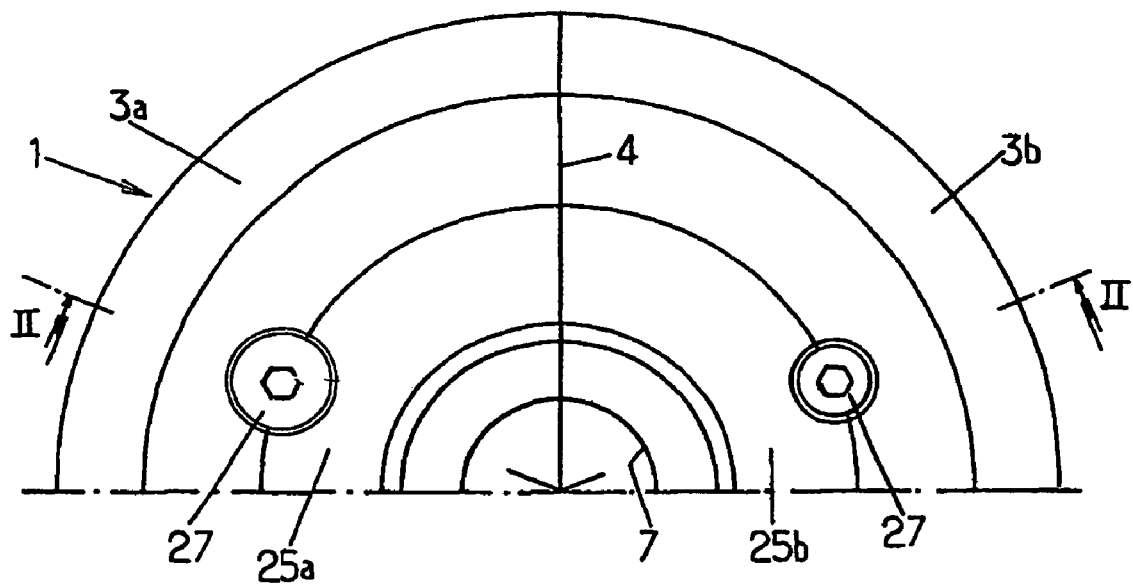

BELL-NOZZLE BLOW-MOLDING OR STRETCH-BLOW-MOLDING PLANT FOR MAKING THERMOPLASTIC CONTAINERS AND MOLD THEREFOR

FIELD OF THE INVENTION

The present invention generally relates to the field of making containers (and in particular bottles) made from thermoplastic material, such as PET, by blow-molding or stretch-blow-molding from a blank in a blowing mold.

More specifically, it relates to improvements made to blow-molding or stretch-blow-molding plants for the manufacture of containers from blanks, for example consisting of preforms, made from thermoplastic polymer, in particular PET, this plant comprising a blowing nozzle of the bell-nozzle type for blowing a pressurized fluid into a blank arranged in a molding cavity of a mold, said nozzle having a bell-shaped end which is suitable, during blow-molding, for being sealingly supported in front against a support plate provided in a wall of the mold, capping the neck of the blank which emerges from said wall on which it is supported by an annular flange whilst its body is engaged in said molding cavity.

The invention also relates to improvements made to molds for such plants, molds designed for the manufacture of containers made from thermoplastic material, in particular PET, by blow-molding or stretch-blow-molding from a blank, for example consisting of a preform, said molds having a surface which is provided with an opening communicating with a molding cavity and which is provided with a support plate defining said opening and suitable for supporting the front end of a bell-shaped blowing nozzle, known as a "bell nozzle".

BACKGROUND OF THE INVENTION

The aforementioned support plate is a removable wear part which is designed to be replaced when it is worn following repeated contact with the front end of the blowing nozzle and it prevents the surface of the mold itself from being worn, with the drawbacks which this would entail.

In the known plants of the type targeted by the invention (see for example, the documents FR 2 764 544 FIGS. 1, 3, 4 and 6; FR 2 828 829 FIG. 1; FR 2 833 512 FIGS. 8 to 10; FR 2 841 495 FIGS. 2A-2C and 3; FR 2 843 714 FIGS. 1 and 3), it is known to design the support plate not only so that it receives the front end of the nozzle but also so that it defines the opening for receiving the neck of the blank to be blow-molded and that it supports said blank by its flange. Such a design had been regarded as desirable to facilitate the customizing of the plant with regard to the manufacture of containers of the same volume but with necks of different diameters: in this case, it was sufficient to change the support plates. The support plate of these known plants is therefore a metallic part of relatively large dimensions and which is, therefore, costly. The wear of this support plate in contact with the blowing nozzle occurs relatively rapidly: it therefore has to be replaced relatively often, resulting in not inconsiderable expenditure for this maintenance job, whilst the replacement of the support plates for the purposes of customization of the plant occurs less frequently than that which had been originally expected.

BRIEF DESCRIPTION OF THE INVENTION

The object of the invention is essentially to alleviate this drawback and to propose an improved solution which is more satisfactory to users without causing substantial additional costs during the manufacture of the molds.

To this end, according to a first aspect thereof, the invention proposes a plant as mentioned in the preamble which, being designed according to the invention, is characterized in that the support plate is ring-shaped having an outline of similar shape to that of the outline of the end of the nozzle, said ring being engaged in a gutter which is hollowed out in said wall of the mold and which surrounds, spaced apart, the opening through which the neck of the blank passes.

Due to this design, the support plate is reduced to its single geometric portion which is useful for avoiding the wear of the mold itself in contact with the front surface of the blowing nozzle: this ring shape of the support plate results in a part of reduced size which is much less costly than the large support plate used until now.

As regards the support for the blank, the opening for receiving the neck is henceforth defined in the mold itself and the blank rests with its flange on the part of the mold defining the edge of this opening. If the user wishes to process blanks having a neck of larger diameter, henceforth the opening has to be machined again to enlarge said opening; but this is a drawback of relatively infrequent occurrence as, in practice, changes to the diameter of the neck for a molding cavity retaining the same dimensions are relatively rare and may be accepted relative to the savings made by the plant in providing support rings, savings which extend over the entire duration of the life of the mold.

Normally, the end of the nozzle is circular. In these conditions the ring is preferably annular and the receiving gutter is annular and concentric with the opening through which the neck of the blank passes.

In normal practice, the mold comprises at least two half-molds which may be separated from one another. In this context, it is provided that each half-mold is provided with a semi-annular gutter section, suitable for receiving one respective semi-annular half-ring. Such an arrangement is applied, in particular, in the currently very common case where the mold comprises two half-molds which may be mutually separated, which is, for example, the case of billfold molds which are used by the Applicant and of which the mutual separation is obtained by rotation about an axis of articulation.

Taking account of the significant forces which the support ring has to bear, the ring is preferably metallic, for example typically made from steel or special bronze. However, the use of plastic or synthetic rings is also conceivable.

According to a second aspect thereof, the invention proposes, for equipping a plant as above, a mold as mentioned in the preamble which, being designed according to the invention, is characterized in that the support plate is ring-shaped, having an outline of similar shape to that of the outline of the end of the nozzle, said ring being engaged in a gutter which is hollowed out in said wall of the mold and which surrounds, spaced apart, said opening.

A mold designed according to the invention, therefore, has a neck opening defined directly in a mold surface, whilst said opening is surrounded, spaced apart, by a gutter in which said ring is embedded.

In one embodiment, the ring is annular and the receiving gutter is annular and concentric with the opening through which the neck of the blank passes.

Typically, the mold comprises at least two half-molds which may be separated from one another: each half-mold is then provided with a semi-annular gutter section suitable for receiving one respective semi-annular half-ring. Such an arrangement is commonly applied in molds arranged in the machines of the Applicant, which are of the billfold type, comprising two half-molds which may be mutually separated by rotation about an axis of articulation; more generally, such an arrangement is commonly applied in molds comprising two half-molds which may be separated from one another by any means.

The ring is preferably metallic, in particular made from steel or special bronze.

In a variant, the ring is made of plastic; in a further variant, the ring is made from synthetic material having the required mechanical properties.

BRIEF DESCRIPTION OF THE DRAWINGS

The invention will be better understood by reading the description which follows of specific preferred embodiments, given solely by way of non-limiting example. In this description, reference is made to the accompanying drawings, in which:

FIG. 2 is a side view, in section along the line II-II of FIG. 3 and at a larger scale, of the only upper part of a mold designed according to the invention; and FIG. 3 is a half-view from above of a mold implementing the arrangements of FIG. 2.

DETAILED DESCRIPTION OF THE INVENTION

Figure 1:
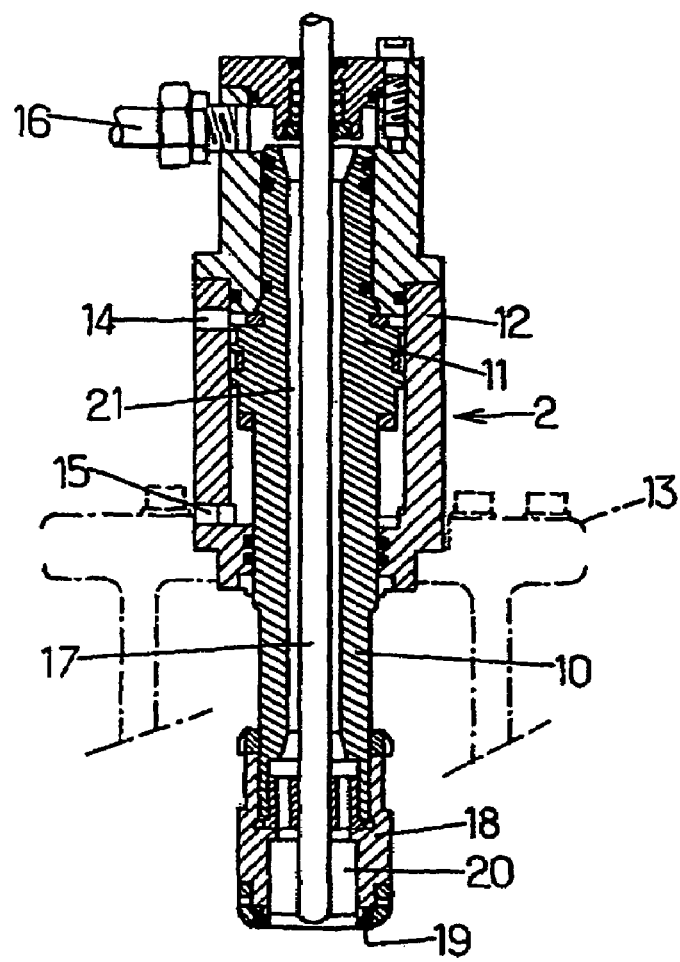
FIG. 1 is a very schematic view of a stretch-blow-molding plant designed according to the invention.
Figure 1:
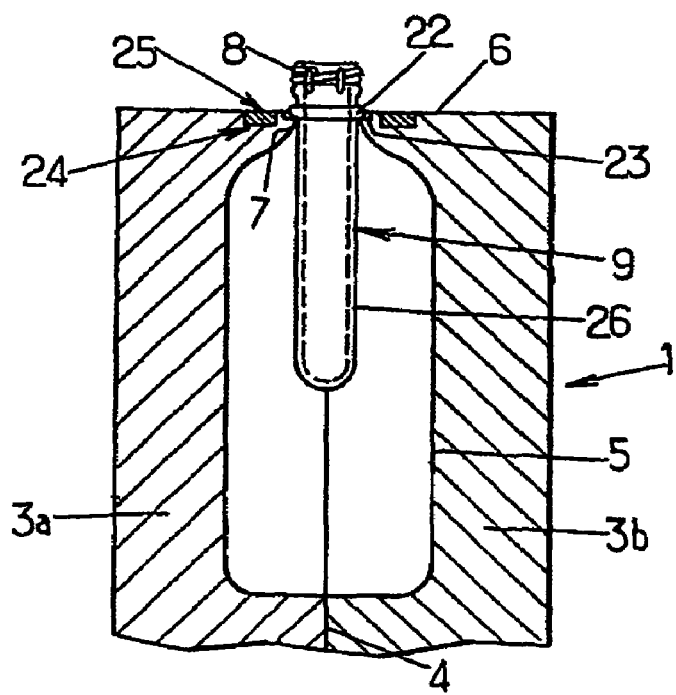

FIG. 1 shows very schematically a plant for molding by stretch-blow-molding, by means of a nozzle of the bell-nozzle type, such as appears in its general design in the document FR 2 764 544, to which reference will be made for all the details of design and function. Only the details necessary for understanding the present invention will be explained below. It should be emphasized that the plant shown in FIG. 1 constitutes a structural and functional entity but that, in practice, a manufacturing unit comprises a multiplicity of such plants grouped together on a rotary frame of the carousel type so that a large number of containers may be produced in series.

The plant of FIG. 1 comprises a mold 1 and, associated therewith, a stretch-blow-molding device 2.

The mold 1 principally comprises two half-molds 3a and 3b, (in addition to possibly a mobile base, not shown) which are mobile relative to one another so as to be able to be opened or closed by the action of drive means not shown. Reference numeral 4 denotes the parting line of the two half-molds. The half-molds are concave inside so as to define, in their closed position, a molding cavity 5 or at the very least a large part of the molding cavity 5, when a mobile mold base is present.

The upper surface 6 of the mold is designed to define an opening 7 communicating with the cavity 5 and through which is engaged the neck 8 of a blank 9 (in this case, a preform) to be processed. This part, which is more particularly concerned by the improvements according to the invention, will be described below in more detail.

The stretch-blow-molding device 2 principally comprises a tube 10 partially designed in the form of a piston 11 sealingly slidably engaged in a portion forming a cylinder 12 which is supported fixedly on a frame 13 which, in turn, supports the mold 1 by means not shown. The part forming the cylinder 12 is provided with orifices 14, 15 for the selective admission of a control fluid so as to control the displacement of the tube 10 upward or downward.

The upper end of the tube 10 is closed and connected at 16 to a source of blowing fluid under high pressure (typically $40 \times 10^5$ Pa). The blowing fluid circulates in the annular space 21 defined between the tube 10 and a stretch rod 17 extending coaxially to the inside of the tube.

The stretch rod 17 is selectively displaceable upward or downward depending on the blow-molding process.

The lower end of the tube 10 is widened, so as to form a type of bell, constituting the actual blowing nozzle 18, the internal volume 20 of which is sufficient to accommodate the neck 8 of the blank in the blowing position. In other words, in particular, the internal dimension (in particular the diameter) of the nozzle 18 is greater than the external diameter of the neck 8 of the blank 9. The front end of the nozzle 18 is provided with a gasket 19.

According to the invention, the blank 9 rests, by means of the flange 22 provided on the base of its neck 8, directly on the upper surface 6 of the mold, for example on the base of a counterbore 23 provided in this surface 6, as shown in FIG. 1, the body 26 of the blank being engaged in the cavity 5.

As is also seen more clearly in FIG. 2, at a larger scale, (in which the shape of the cavity 5 substantially differs from that of the cavity illustrated in FIG. 1), around the counterbore 23 and without structural dependency therewith, is provided a groove or gutter 24 extending over a closed outline and in which a support ring 25 is embedded which has an outline of similar shape to that of the front end of the nozzle 18. In other words, the gutter 24 extends around the opening 7 through which the neck of the blank passes and spaced apart therefrom.

In general, the end of the nozzle is circular and, in this case, the ring 25 is annular; the receiving gutter 24 is then annular and concentric with the opening 7 through which the neck of the blank passes.

Preferably, as shown in FIGS. 1 and 2, the ring 25 is completely embedded in the gutter 24, its upper surface flush with the surface 6 of the mold.

The ring 25 is generally metallic, in particular made from steel or special bronze, so as to be mechanically resistant. Nevertheless, it may be made of plastic or any other synthetic material selected so as to have the required mechanical properties.

The half-molds 3a, 3b, being able to be separated from one another, as explained above, are provided respectively with semi-annular gutter sections 24a, 24b adapted to receive one respective half-ring 25a, 25b, as is visible in FIGS. 1 and 2 of which the cutting plane is substantially transverse to the parting line 4 of the two half-molds.

Preferably, blocking means are provided to maintain the ring 25 or each half-ring 25a, 25b in the gutter 24 or respectively in each semi-annular gutter section 24a, 24b. As illustrated in FIGS. 2 and 3, these blocking means may be bolts or screws 27 that are screwed into tapped bores 28. The heads of these bolts or screws are countersunk in respective housings so as to not project above the surface 6.

Thus, the ring 25, respectively each half-ring 25a, 25b, is an easily replaceable wear part, smaller than the neck plates used up to now. Requiring less material, the ring 25, respectively each half-ring 25a, 25b, is substantially less costly that the current neck plate, respectively each current half-plate of the neck. A modification to the diameter of the neck of the blanks and the containers to be manufactured is obtained by repeating the machining of the passage 7 of the mold.

The invention claimed is:

1. A mold for the manufacture of containers made from thermoplastic material by blow-molding or stretch-blow-molding from a blank, said mold having a surface which is provided with an opening communicating with a molding cavity and which is provided with a support plate defining said opening and suitable for supporting the front end of a blowing bell nozzle, wherein the support plate is shaped like a ring having an outline of similar shape to that of the outline of the end of the nozzle, said ring being engaged in a gutter which is hollowed out in said surface of the mold and which surrounds said opening while being radially spaced apart thereof.

2. The mold as claimed in claim 1, wherein the ring is annular and wherein the receiving gutter is annular and concentric with the opening through which the neck of the blank passes.

3. The mold as claimed in claim 1, comprising at least two half-molds which may be separated from one another and wherein each half-mold is provided with a semi-annular gutter section adapted to receive one respective semi-annular half-ring.

4. The mold as claimed in claim 3, comprising two half-molds which may be mutually separated.

5. The mold as claimed in claim 1, wherein the ring is metallic.

6. The mold as claimed in claim 1, wherein the ring is made of plastic.

7. The mold as claimed in claim 1, wherein the ring is made of synthetic material.

8. A blow-molding or stretch-blow-molding plant for the manufacture of containers from blanks made from thermoplastic polymer, said blow-molding or stretch-blow-molding plant comprising a blowing nozzle of the bell-nozzle type for blowing a pressurized fluid into a blank arranged in a molding cavity of a mold, said blowing nozzle having a bell-shaped end which is suitable, during blow-molding, for being sealingly supported in front against a support plate provided in one surface of the mold, capping a neck of the blank which emerges from said surface on which the blank is supported by an annular flange whilst a body of said blank is engaged in said molding cavity, wherein the mold is configured according to claim 1.

9. The plant as claimed in claim 8 wherein the end of the nozzle is circular and the ring is annular.

* * * * *